United States Patent
Yang et al.

(10) Patent No.: US 12,372,666 B2
(45) Date of Patent: Jul. 29, 2025

(54) OBJECT TRACKING METHOD AND SYSTEM

(71) Applicant: Harman International Industries, Incorporated, Stamford, CT (US)

(72) Inventors: Zeng Yang, Shanghai (CN); Guoxia Zhang, Shanghai (CN); Qingshan Zhang, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 1706 days.

(21) Appl. No.: 16/317,503

(22) PCT Filed: Jul. 15, 2016

(86) PCT No.: PCT/CN2016/090196
§ 371 (c)(1),
(2) Date: Jan. 11, 2019

(87) PCT Pub. No.: WO2018/010171
PCT Pub. Date: Jan. 18, 2018

(65) Prior Publication Data
US 2019/0257955 A1    Aug. 22, 2019

(51) Int. Cl.
*G01S 19/51* (2010.01)
*G01S 1/00* (2006.01)
(Continued)

(52) U.S. Cl.
CPC ............... *G01S 19/51* (2013.01); *G01S 1/00* (2013.01); *G01S 13/86* (2013.01); *G01S 17/06* (2013.01); *G01S 17/86* (2020.01); *G01S 19/485* (2020.05)

(58) Field of Classification Search
CPC .......... G01S 19/51; G01S 17/86; G01S 13/86; G01S 17/06; G01S 19/48
(Continued)

(56) References Cited

U.S. PATENT DOCUMENTS 8,498,811 B2 *  7/2013  Lundquist ........... G01S 5/02522
                                                        701/434
2010/0150399 A1   6/2010  Svajda et al.
(Continued)

FOREIGN PATENT DOCUMENTS

CN       101996002 A       3/2011
CN       103207399 A       7/2013
(Continued)

OTHER PUBLICATIONS

European Patent Office, Extended European Search Report Issued in Application No. 16908496.9, dated Feb. 13, 2020, Germany, 8 pages.
(Continued)

*Primary Examiner* — Bo Fan
(74) *Attorney, Agent, or Firm* — McCoy Russell LLP

(57) ABSTRACT

An object tracking method and an object tracking system are provided. The method includes: obtaining a first relative position vector from a first node to a second node at a first time point; obtaining a first position data of the first node and a second position data of the second node at a second time point; identifying a position variation vector from the first node to the second node based on the first position data of the first node and the second position data of the second node; and identifying a second relative position vector from the first node to the second node at the second time point based on the first relative position vector and the position variation vector. The method improves the tracking accuracy.

18 Claims, 4 Drawing Sheets

(51) Int. Cl.
*G01S 13/86* (2006.01)
*G01S 17/06* (2006.01)
*G01S 17/86* (2020.01)
*G01S 19/48* (2010.01)

(58) Field of Classification Search
USPC ............ 342/450, 357.25; 701/489, 704, 434
See application file for complete search history.

(56) References Cited

U.S. PATENT DOCUMENTS

| | | |
|---|---|---|
| 2010/0245171 A1 | 9/2010 | Zeng |
| 2012/0029810 A1* | 2/2012 | Dai .................. G01C 21/20 |
| | | 701/489 |
| 2016/0018527 A1 | 1/2016 | Oh et al. |
| 2017/0236421 A1 | 8/2017 | Yang et al. |

FOREIGN PATENT DOCUMENTS

| | | |
|---|---|---|
| CN | 103879404 A | 6/2014 |
| EP | 3218888 B1 | 3/2020 |
| KR | 20160008878 A | 1/2016 |
| WO | 2016074155 A1 | 5/2016 |

OTHER PUBLICATIONS

ISA State Intellectual Property Office of the People's Republic of China, International Search Report and Written Opinion Issued in Application No. PCT/CN2016/090196, dated Apr. 5, 2017, WIPO, 11 pages.
State Intellectual Property Office of the People's Republic of China, Office Action and Search Report Issued in Application No. 201680087342.9, dated Aug. 15, 2022, 21 pages. (Submitted with Partial Translation).
Fujita, A. et al., "A Study on Identification of Laser-tracked Vehicles Using V2V-based Velocity Information," Proceedings of the 2016 IEEE 17th International Symposium on a World of Wireless, Mobile and Multimedia Networks (WoWMoM), Jun. 21, 2016, Coimbra, Portugal, 6 pages.
European Patent Office, Office Action Issued in Application No. 16908496.9, Oct. 21, 2021, Germany, 7 pages.
Korean Intellectual Property Office, Office Action Issued in Application No. 10-2019-7000981, Aug. 10, 2023, 9 pages.

* cited by examiner

OBJECT TRACKING METHOD AND SYSTEM

CROSS REFERENCE TO RELATED APPLICATIONS

The present application is a U.S. National Phase of International Patent Application Serial No. PCT/CN2016/090196, entitled "OBJECT TRACKING METHOD AND SYSTEM," and filed on Jul. 15, 2016. The entire contents of the above-mentioned application are hereby incorporated by reference for all purposes.

TECHNICAL FIELD

The present disclosure generally relates to an object tracking method and an object tracking system.

BACKGROUND

Nowadays, object tracking methods are developed to track moving objects, such as vehicles. For example, these object tracking methods can be used to track moving objects around a vehicle to remind a driver of these objects, and thus to avoid a potential collision. However, an object out of a radar's detection range cannot be tracked by the current method.

SUMMARY

In one embodiment, an object tracking method is provided. The method includes: obtaining a first relative position vector from a first node to a second node at a first time point; obtaining a first position data of the first node and a second position data of the second node at a second time point; identifying a position variation vector from the first node to the second node based on the first position data of the first node and the second position data of the second node; and identifying a second relative position vector from the first node to the second node at the second time point based on the first relative position vector and the position variation vector.

In some embodiments, the first relative position vector is obtained through a sensor mounted on the first node or the second node.

In some embodiments, obtaining a first relative position vector from a first node to a second node at a first time point includes: obtaining a third relative position vector from the first node to a third node; obtaining a fourth relative position vector from the third node to the second node; and identifying the first relative position vector from the first node to the second node based on the third relative position vector and the fourth relative position vector.

In some embodiments, the third relative position vector is obtained through a sensor mounted on the first node, and the fourth relative position vector is obtained through a sensor mounted on the third node.

In some embodiments, the sensor is a radar, a Lidar or a camera.

In some embodiments, the first position data and the second position data are Global Position System (GPS) raw data.

In some embodiments, the GPS raw data at least includes pseudorange, satellite orbital data and carrier phase.

In some embodiments, the position variation vector from the first node to the second node is obtained by performing a double differentiation operation on the first position data and the second position data.

In some embodiments, the first node and the second node communicate through a communication network.

In some embodiments, the communication network is a Dedicated Short Range Communication (DSRC) network, or a cellular network.

In one embodiment, an object tracking system is provided. The system includes a processing device, and the processing device is configured to: obtaining a first relative position vector from a first node to a second node at a first time point; obtaining a first position data of the first node and a second position data of the second node at a second time point; identifying a position variation vector from the first node to the second node based on the first position data of the first node and the second position data of the second node; and identifying a second relative position vector from the first node to the second node at the second time point based on the first relative position vector and the position variation vector.

In some embodiments, the first relative position vector is obtained through a sensor mounted on the first node or the second node.

In some embodiments, the processing device is further configured to: obtaining a third relative position vector from the first node to a third node; obtaining a fourth relative position vector from the third node to the second node; and identifying the first relative position vector from the first node to the second node based on the third relative position vector and the fourth relative position vector.

In some embodiments, the third relative position vector is obtained through a sensor mounted on the first node, and the fourth relative position vector is obtained through a sensor mounted on the third node.

In some embodiments, the sensor is a radar, a Lidar or a camera.

In some embodiments, the first position data and the second position data are Global Position System (GPS) raw data.

In some embodiments, the GPS raw data at least includes pseudorange, satellite orbital data and carrier phase.

In some embodiments, the position variation vector from the first node to the second node is obtained by performing a double differentiation operation on the first position data and the second position data.

In some embodiments, the first node and the second node communicate through a communication network.

In some embodiments, the communication network is a Dedicated Short Range Communication (DSRC) network, or a cellular network.

In one embodiment, a system for tracking an object is provided. The system includes a first relative position vector determination unit adapted to obtain a first relative position vector from a first node to a second node at a first time point; a position data determination unit adapted to obtain a first position data of the first node and a second position data of the second node at a second time point; a position variation vector determination unit adapted to identify a position variation vector from the first node to the second node based on the first position data of the first node and the second position data of the second node; and a second relative position vector determination unit adapted to identify a second relative position vector from the first node to the second node at the second time point based on the first relative position vector and the position variation vector.

By employing the object tracking method and the object tracking system described above, the object beyond line-of-sight can be tracked, and the tracking accuracy can be improved.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
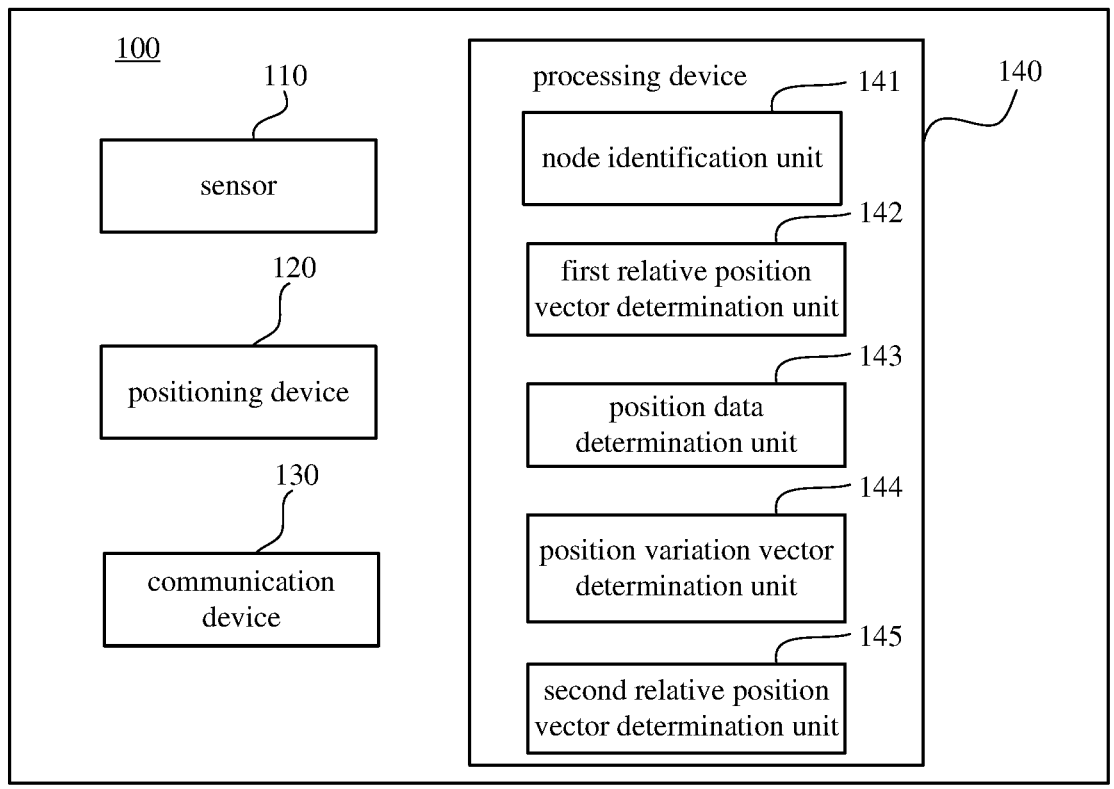
FIG. 1 schematically illustrates a block diagram of an object tracking system according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

It should be noted that, the terms "first", "second", and the like in the description and in the claims, are used to distinguishing between similar elements and do not tend to describe a particular sequential and chronological order.

FIG. 1 is a schematic block diagram of an object tracking system 100 according to an embodiment of the present disclosure.

Referring to FIG. 1, the object tracking system 100 includes a sensor 110, a positioning device 120, a communication device 130 and a processing device 140. In some embodiments, the object tracking system 100 may be mounted on a vehicle to track moving objects in vicinity of the vehicle.

In some embodiment, the object tracking system 100 only includes the processing device 140. The sensor 110, the positioning device 120, the communication device 130 and the object tracking system 100 are mounted on a same node. The processing device 140 of the object tracking system 100 is configured to control or communicate with the sensor 110, the positioning device 120 and the communication device 130.

The sensor 110 is adapted for detecting a plurality of features of a line-of-sight object, such as a speed of the object or a distance between the sensor 110 and the object.

In some embodiments, the sensor 110 may be a radar. Radar is an object-detection system that uses radio waves to determine the range, angle, or velocity of objects. Nowadays, radar is available to many vehicles for detecting a line-of-sight object and has a high accuracy. However, once the object is out the detection range of the radar, the object is missed.

In some embodiments, the sensor 110 may be a Lidar (Light Detection and Ranging). Lidar measures a distance by illuminating an object with a laser light, so it has a higher accuracy than radar.

In some embodiments, the sensor 110 may be a camera. The camera may be used to capture one or more pictures of an object, and then these pictures can be used to determine a position, a size, a speed or other features of the object.

The positioning device 120 is adapted for obtaining position data of the node on which the tracking system 100 is mounted.

In some embodiments, the positioning device 120 may be a GPS (Global Position System) device. GPS devices have been widely used in most vehicles for navigation and localization purposes. The GPS devices can determine their location (longitude, latitude and altitude) using time signals transmitted from satellites. Shared GPS data among vehicles through communication technologies like DSRC (Dedicated Short Range Communication) or cellular may enable non-line-of-sight detection of remote vehicles. However, low-cost GPS receivers exhibit tens of meters of error or worse in challenging environments.

In some embodiments, the positioning device 120 may be other satellite navigation devices. For example, the positioning device 120 may be a GLONASS (GLObal'naya NAvigatsionnaya Sputnikovaya Sistema) device, a Galileo navigation device, a BeiDou Navigation device, or other GNSS (Global Navigation Satellite System) devices.

The communication device 130 is adapted for receiving position data transmitted in a communication network. For example, as shown in FIG. 1, there are a first node 10 and a second node 20 within a communication network. For example, the first node 10 and the second node are two vehicles. The object tracking system 100 shown in FIG. 1 is mounted on the first node 10. The second node 20 may broadcast its position data periodically in the communication network. The position data of the second node 20 may be obtained by a GPS mounted on the second node 20. Thus, the communication device 130 mounted on the first node 10 can receive the position data of the second node 20 through the communication network.

In some embodiments, the communication network is a DSRC (Dedicated Short Range Communication) network. For example, the DSRC network may be a VANET (Vehicular ad hoc network). Vehicles within the VANET may broadcast their position, velocity, acceleration status and braking status information periodically.

In some embodiments, the communication network may be a cellular network, for example, a 3G network, a 4G network or a 5G network. The second node 20 may transmit its position data to the first node 10, and the position data can be received by the communication device 130 mounted on the first node 10.

In some embodiments, the first node 10 and the second node 20 can use other types of communication networks to communicate, as long as a message can be transmitted between the first node 10 and the second node 20.

The processing device 140 is configured to process information obtained by the sensor 110, the positioning device 120 and the communication device 130, so as to track an object in the communication network. The processing device 120 may be an integrated circuit, a CPU, a MCU, a DSP, etc. In some embodiments, as shown in FIG. 1, the processing device 140 includes: a first relative position vector determination unit 142 adapted to obtain a first relative position vector from a first node to a second node at a first time point; a position data determination unit 143 adapted to obtain a first position data of the first node and a second position data of the second node at a second time point; a position variation vector determination unit 144 adapted to identify a position variation vector from the first node to the second node based on the first position data of the first node and the second position data of the second node; and a second relative position vector determination unit 145 adapted to identify a second relative position vector from the first node to the second node at the second time point based on the first relative position vector and the position variation vector.

Figure 2:
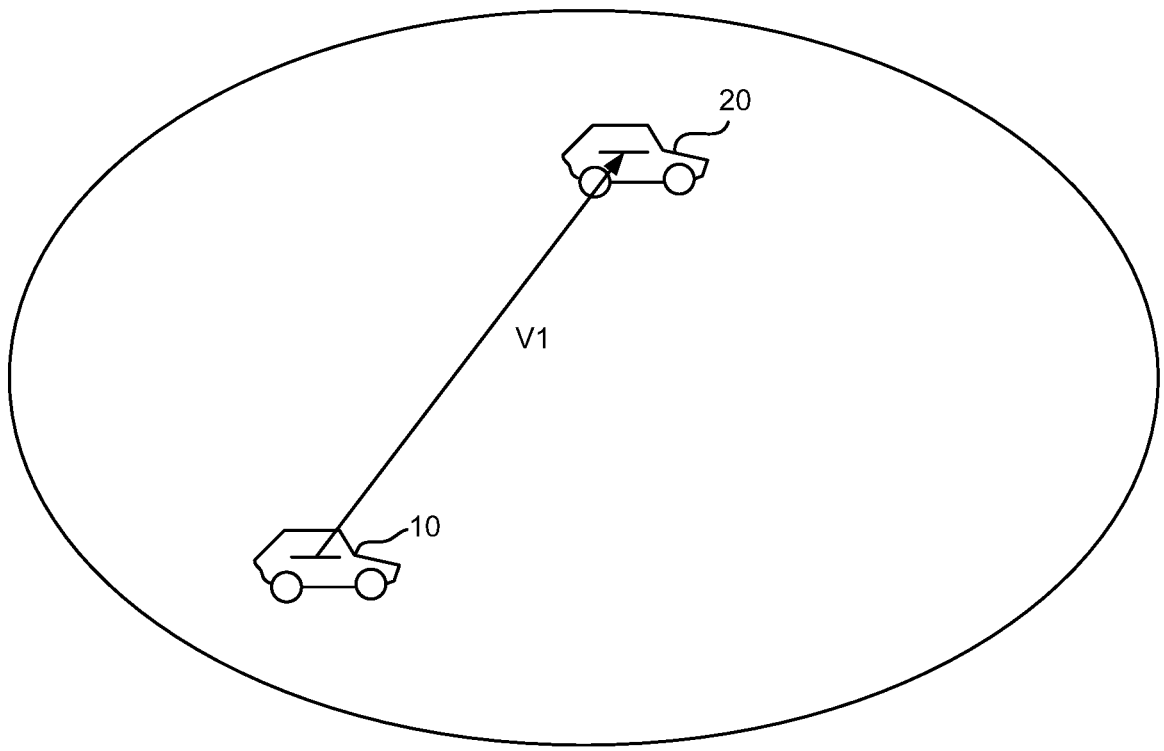
FIG. 2 to FIG. 5 schematically illustrate different application scenarios of the object tracking system according to different embodiments.

Taking FIG. 2 as an example, the object tracking system 100 shown in FIG. 1 is mounted on the first node 10 to track the second node 20 in the communication network. The processing device 140 of the object tracking system further includes a node identification unit 141. First, the node identification unit 141 of the processing device 140 is configured to identify the second node 20 in the communication network.

In some embodiments, the node identification unit 141 of the processing device 140 may control the sensor 110 to obtain a first plurality of features of the second node 20, for example, a speed of the second node 20, a heading of the second node 20, or a distance between the first node 10 and the second node 20. The node identification unit 141 also controls the communication device 130 to receive messages transmitted from neighbouring nodes within the communication network. Each message may include a second plurality of features of a candidate node, such as speed, heading and position. For example, if the message includes a GPS data, a distance from the first node 10 to the candidate node can be calculated based on GPS coordinates in the GPS data. Then, the node identification unit 141 compares the second plurality of features with the first plurality of features. If a similarity index between the first plurality of features and the second plurality of features is larger than a threshold value, the node identification unit 141 may identify the candidate node as the second node 20. If not, the node identification unit 141 may compare the first plurality of features of the second node 20 with other candidate nodes in the communication network.

In some embodiments, the node identification unit 141 of the processing device 140 may control the sensor to obtain a first position vector from the first node 10 to the second node 20 at a first time point and a second position vector at a second time point. Then the node identification unit 141 could calculate a first position variation vector by differencing the first position vector and the second position vector. The node identification unit 141 also controls the positioning device 120 to obtain a GPS position data of the first node 10 and controls the communication device 144 to receive a GPS position data of a candidate node at different times. Thus the node identification unit 141 could calculate a second position variation vector between the first node 10 and the candidate node based on the GPS data. By comparing the first position variation vector and the second position variation vector, the node identification unit 141 can determine whether the candidate node is the second node 20. It should be noted that a coordinate system calibration may be performed in the identification process, because the first base line change calculated from the sensor data is in the local NEU frame while the second position variation vector calculated from the GPS data is in the XYZ frame.

In some embodiments, the node identification unit 141 may be configured to perform the identification process several times to improve the accuracy.

The first relative position vector determination unit 142 of the processing device 140 is configured to obtain a first relative position vector from the first node 10 to the second node 20 at a first time point.

In some embodiments, the first relative position vector is obtained by the sensor 110 mounted on the first node 10. Referring to FIG. 2, the second node 20 is in the detection range of the sensor 110 mounted on the first node 10. The sensor 110 may be a radar or a Lidar device. Because the radar is an accurate line-of-sight object detection system, the first relative position vector V1 from the first node 10 to the second node 20 obtained by the radar is highly accurate. In some embodiments, the first relative position vector V1 may be obtained by a sensor mounted on the second node 20, and the second node 20 transmits the first relative position vector V1 to the first node 10.

Figure 3:
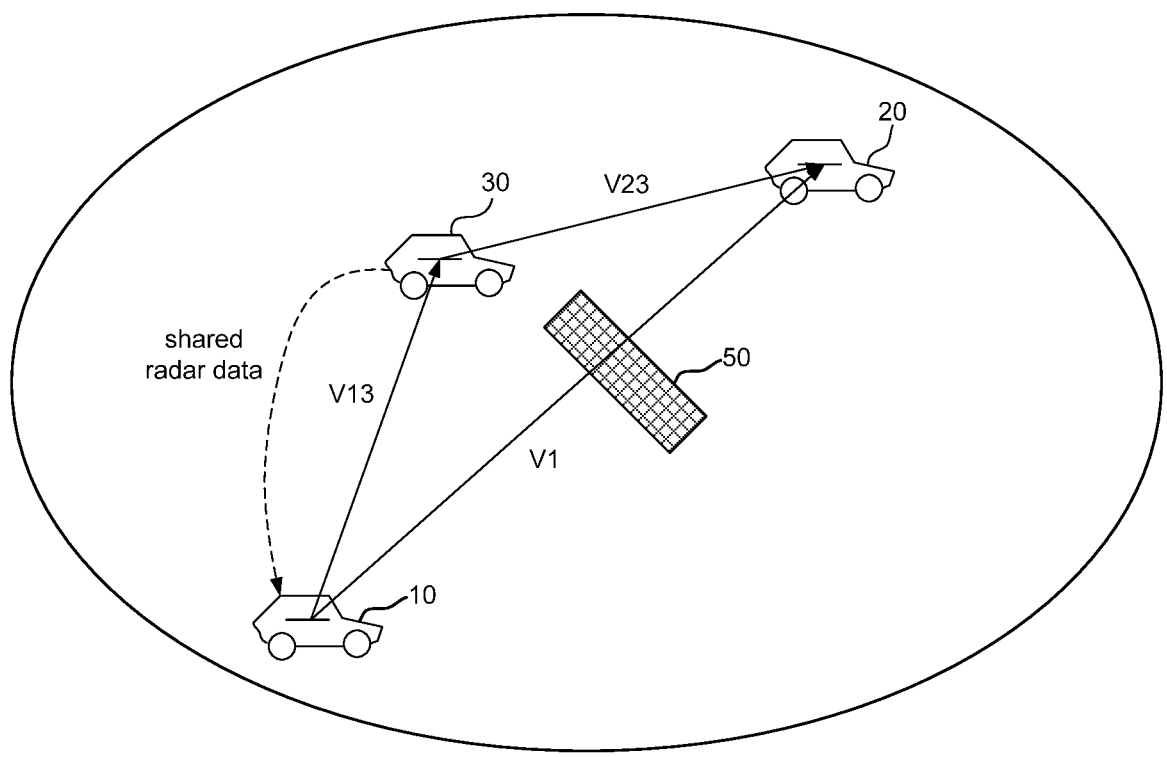

In some embodiment, the first relative position vector V1 is obtained through a third node 30. Referring to FIG. 3, the first node 10, the second node 20 and the third node 30 are within a communication network. The second node 20 is out of the detection range of the first node 10 because there is an obstacle 50 between them. The obstacle 50 may be a building or a big truck. However, the third node 30 is in the detection range of the first node 10 and the second node 20 is in the detection range of the third node 30. Thus, the first relative position vector determination unit 142 is configured to control the sensor 110 mounted on the first node 10 to obtain a third relative position vector V13 from the first node 10 to a third node 30. A sensor, such as a radar, mounted on the third node 30 may be used to detect a fourth relative position vector V23 from the third node 30 to the second node 20, and then the third node 30 shared the fourth relative position vector V23 with the first node 10. The first relative position vector determination unit 142 is also configured to control the communication device 130 to receive fourth relative position vector V23 from the third node 30. Then the first relative position vector determination unit 142 may calculate the first relative position vector V1 from the first node 10 to the second node 20 based on the fourth relative position vector V23 and the third relative position vector V13.

The position data determination unit 143 of the processing device 140 is configured to obtain a first position data of the first node 10 and a second position data of the second node 20 at a second time.

As the first node 10 or the second node 20 are moving with time, a real-time relative position vector from the first node 10 to the second node 20 may be different from the first relative position vector V1. In some embodiments, the position data determination unit 143 controls the positioning device 120 to obtain the first position data of the first node 10, and controls the communication device 130 to receive the second position data of the second node 20 at the second time, wherein the first position data is obtained by the positioning device 120 mounted on the first node, and the second position data of the second node 20 is broadcasted in the communication network. The first position data and the second position data may be satellite navigation data.

In some embodiments, the first position data of the first node 10 and the second position data of the second node 20 are GPS raw data. The GPS raw data at least includes pseudorange, satellite orbital data and carrier phase.

The position variation vector determination unit 144 is configured to identify a position variation vector from the first node 10 to the second node 20 based on the first position data of the first node 10 and the second position data of the second node 20.

In some embodiment, the position variation vector determination unit 144 is configured to perform a double differentiation operation on the first position data and the second position data to obtain the position variation vector from the first node 10 to the second node 20. The double differentiation operation uses highly accurate carrier phase observations to produce unambiguous estimates of the change in relative ranges between a satellite and two receivers through time without requiring any sort of reference satellite or node. Thus the double differentiation operation can eliminate ambiguity terms that plaguing traditional GPS accuracy, and achieve an order of magnitude improvement in localization accuracy over the traditional absolute positioning algorithms provided by standard GPS device. The position variation vector V2 from the first node 10 to the second node 20 is illustrated in both FIG. 4 and FIG. 5.

The second relative position vector determination unit 145 of the processing device 140 is configured to identify a relative position vector V3 from the first node 10 to the second node 20 based on the first relative position vector V1 and the position variation vector V2.

Figure 4:
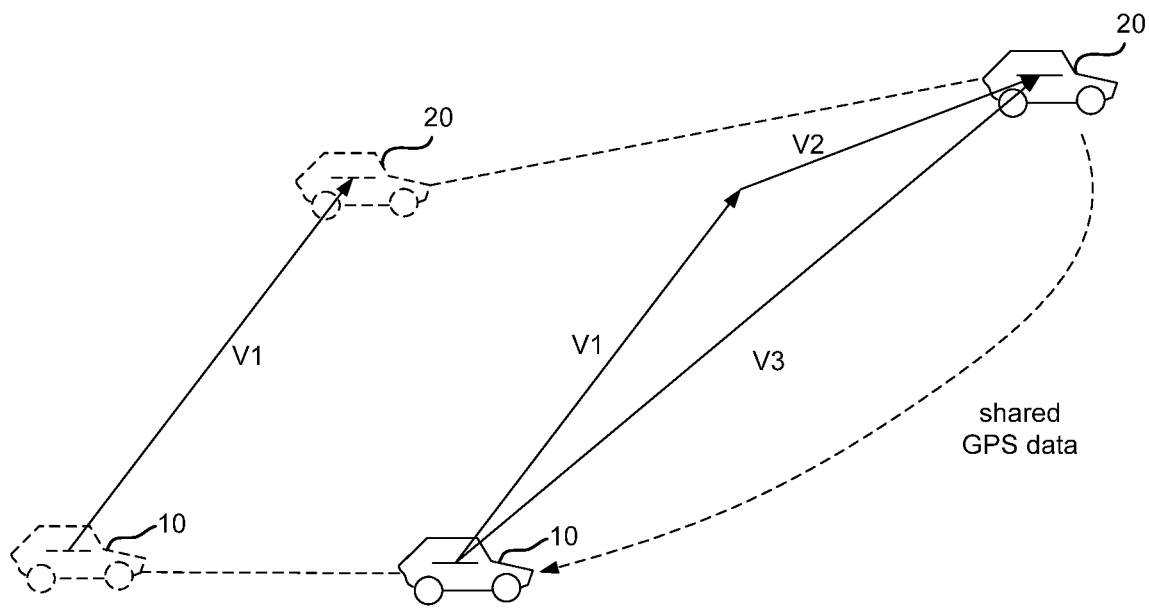
Figure 5:
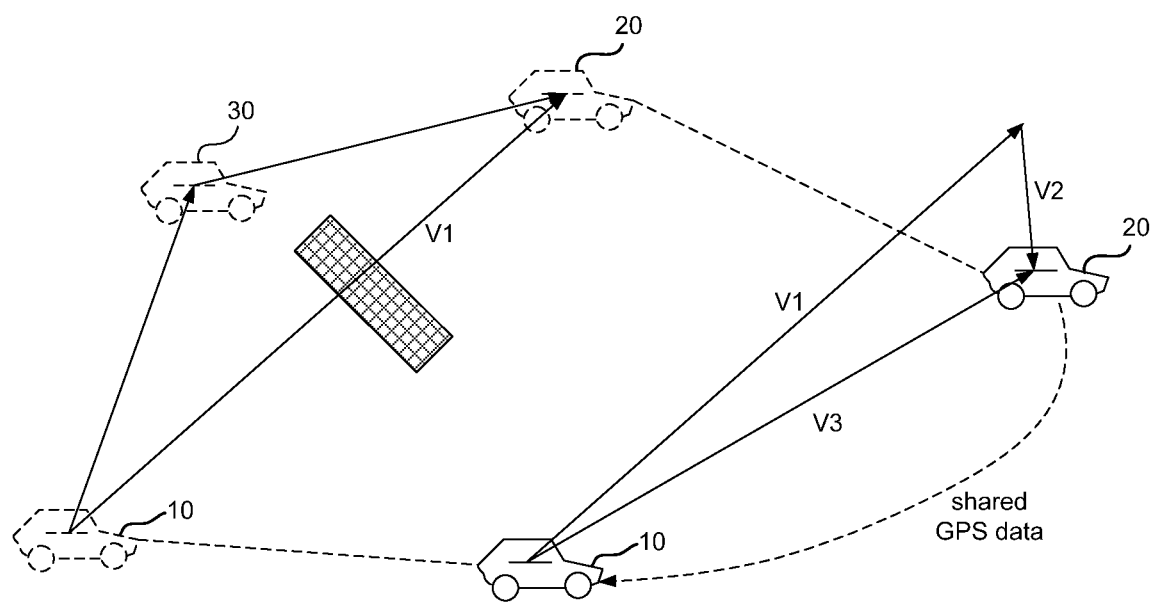

In some embodiments, referring to FIG. 4 and FIG. 5, the second relative position vector determination unit 145 is configured to add the first relative position vector V1 and the position variation vector V2 to obtain the relative position vector V3.

Because both the first relative position vector V1 and the position variation vector V2 are highly accurate, the relative position vector V3 is also highly accurate. Moreover, because the position variation vector V2 is obtained based on GPS data, the relative position vector V3 could be calculated once the first relative position vector V1 is determined, even if the second node 20 is out of the radar range of the first node.

The present disclosure further provides an object tracking method.

Figure 6:
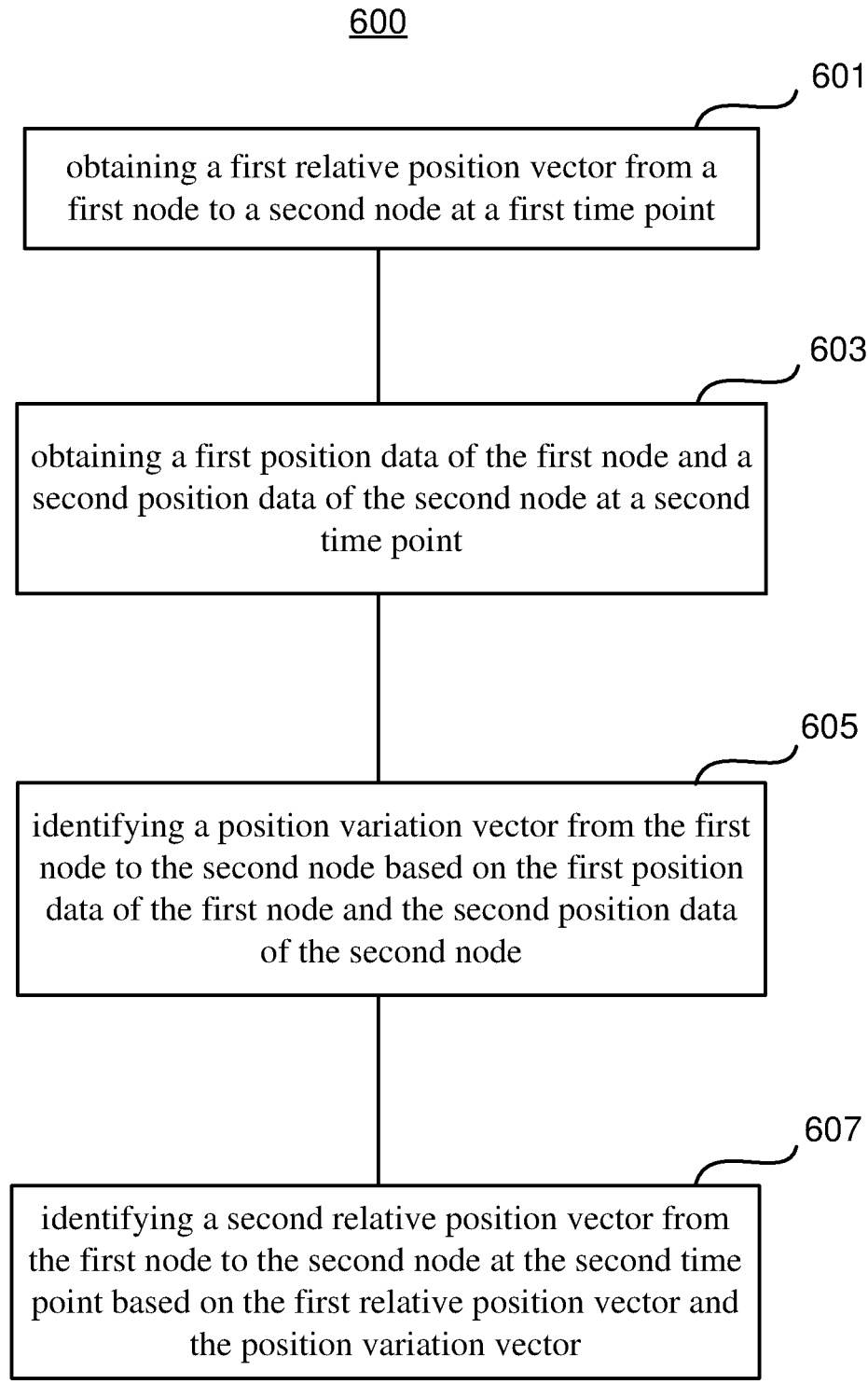
FIG. 6 schematically illustrates a flow chart of an object tracking method according to an embodiment.

FIG. 6 is a flow chart of an object tracking method according to an embodiment of the present disclosure. In some embodiment, as shown in FIG. 2-FIG 5, the object tracking method may be performed by the first node 10 to track the second node 20 in the communication network.

Referring to FIG. 6, in 601, a first relative position vector from a first node to a second node at a first time point is obtained.

In some embodiments, before the first relative position vector from the first node to the second node is obtained, the first node identifies the second node in the communication network. In some embodiments, the first node identifying the second node in the communication network may include: obtaining a first plurality of features of the second node through a sensor mounted on the first node; receiving a message including a second plurality of features of a candidate node through the communication network; and identifying the candidate node as the second node if a similarity index between the first plurality of features and the second plurality of features is larger than a threshold value.

After the second node is identified, the first relative position vector from the first node to the second node is obtained. In some embodiments, the first relative position vector is obtained through a sensor mounted on the first node. In some embodiments, obtaining the first relative position vector from the first node to the second node at the first time point includes: obtaining a third relative position vector from the first node to a third node; obtaining a fourth relative position vector from the third node to the second node; and identifying the first relative position vector from the first node to the second node based on the third relative position vector and the fourth relative position vector. The third relative position vector is obtained through a sensor mounted on the first node, and the fourth relative position vector is obtained through a sensor mounted on the third node.

In some embodiments, the sensor is a radar, a Lidar or a camera. The communication network is a Dedicated Short Range Communication (DSRC) network, or a cellular network.

In 603, a first position data of the first node and a second position data of the second node are obtained at a second time point.

In some embodiments, the first position data and the second position data are Global Position System (GPS) raw data, wherein the GPS raw data includes pseudorange, satellite orbital data and carrier phase. In some embodiments, the first position data and the second position data are respectively obtained by GPS devices mounted on the first node and the second node. The second node may transmit the second position data to the first node through the communication network.

In 605, a position variation vector from the first node to the second node is identified based on the first position data of the first node and the second position data of the second node.

In some embodiments, a double differentiation operation is performed on the first position data of the first node and the second position data of the second node to obtain the position variation vector.

In 607, a second relative position vector from the first node to the second node at the second time point are obtained based on the first relative position vector and the position variation vector.

More detail about the object tracking method can be found in the description of the object tracking system 100, and is not described herein.

In some embodiments, the object tracking method may be conducted by a third party rather than the first node.

According to one embodiment, a non-transitory computer readable medium, which contains a computer program for object tracking is provided. When the computer program is executed by a processor, it will instructs the processor to: obtain a first relative position vector from a first node to a second node at a first time point; obtain a first position data of the first node and a second position data of the second node at a second time point; identify a position variation vector from the first node to the second node based on the first position data of the first node and the second position data of the second node; and identify a second relative position vector from the first node to the second node at the second time point based on the first relative position vector and the position variation vector.

There is little distinction left between hardware and software implementations of aspects of systems; the use of hardware or software is generally a design choice representing cost vs. efficiency trade-offs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustra-

The invention claimed is:

1. An object tracking method, comprising:
   obtaining a first relative position vector from a first node to a second node at a first time point via a sensor mounted on the first node;
   obtaining a first position data of the first node at a second time point via a first Global Positioning System (GPS) device on the first node, and a second position data of the second node at the second time point via a second GPS device on the second node, wherein the first position data and the second position data are GPS raw data;
   receiving at the first node, via a communication network, the second position data from the second node;
   identifying a position variation vector from the first node to the second node based on the first position data of the first node and the second position data of the second node;
   identifying a second relative position vector from the first node to the second node at the second time point based on adding the first relative position vector and the position variation vector; and
   identifying, prior to obtaining the first relative position vector, the second node, wherein identifying the second node comprises:
   obtaining a first plurality of features of the second node through one or more sensors mounted on the first node, wherein the first plurality of features comprises at least one of a speed of the second node, a heading of the second node, and a distance between the first node and the second node;
   receiving at the first node, via the communication network, a message including a second plurality of features of a candidate node, wherein the second plurality of features comprises at least one of a speed of the candidate node, a heading of the candidate node, and a GPS position of the candidate node; and
   identifying the candidate node as the second node if a similarity index between the first plurality of features and the second plurality of features is larger than a threshold value.

2. The method according to claim 1, wherein obtaining a first relative position vector from a first node to a second node at a first time point comprises:
   obtaining a third relative position vector from the first node to a third node;
   obtaining a fourth relative position vector from the third node to the second node; and
   identifying the first relative position vector from the first node to the second node based on the third relative position vector and the fourth relative position vector.

3. The method according to claim 2, wherein the third relative position vector is obtained through a sensor mounted on the first node, and the fourth relative position vector is obtained through a sensor mounted on the third node.

4. The method according to claim 1, wherein the sensor is a radar, a Lidar or a camera.

5. The method according to claim 1, wherein the first position data and the second position data are Global Position System (GPS) raw data.

6. The method according to claim 5, wherein the GPS raw data comprises pseudorange, satellite orbital data and carrier phase.

7. The method according to claim 1, wherein the first node and the second node communicate through a communication network.

8. The method according to claim 7, wherein the communication network is a Dedicated Short Range Communication (DSRC) network, or a cellular network.

9. An object tracking system, comprising a processing device configured to:
   obtain a first relative position vector from a first node to a second node at a first time point, the first relative position vector being obtained through one or more sensors mounted on the first node;
   obtain a first position data of the first node at a second time point via a first Global Positioning System (GPS) device on the first node;
   obtain a second position data of the second node at the second time point via a second GPS device on the second node, wherein the first position data and the second position data are GPS raw data;
   receive at the first node, via a communication network, the second position data from the second node;
   identify a position variation vector from the first node to the second node based on the first position data of the first node and the second position data of the second node;
   identify a second relative position vector from the first node to the second node at the second time point based on adding the first relative position vector and the position variation vector; and
   identify, prior to obtaining the first relative position vector, the second node, wherein identifying the second node comprises:
   obtaining a first plurality of features of the second node through the one or more sensors mounted on the first node, wherein the first plurality of features comprises at least one of a speed of the second node, a heading of the second node, and a distance between the first node and the second node;
   receiving at the first node, via the communication network, a message including a second plurality of features of a candidate node, wherein the second plurality of features comprises at least one of a speed of the candidate node, a heading of the candidate node, and a GPS position of the candidate node; and
   identifying the candidate node as the second node if a similarity index between the first plurality of features and the second plurality of features is larger than a threshold value.

10. The system according to claim 9, wherein the processing device is further configured to:
    obtain a third relative position vector from the first node to a third node;
    obtain a fourth relative position vector from the third node to the second node; and
    identify the first relative position vector from the first node to the second node based on the third relative position vector and the fourth relative position vector.

11. The system according to claim 10, wherein the third relative position vector is obtained through a sensor mounted on the first node, and the fourth relative position vector is obtained through a sensor mounted on the third node.

12. The system according to claim 9, wherein the sensor is a radar, a Lidar or a camera.

13. The system according to claim 9, wherein the first position data and the second position data are Global Position System (GPS) raw data.

14. The system according to claim 13, wherein the GPS raw data comprises pseudorange, satellite orbital data and carrier phase.

15. The system according to claim 9, wherein the first node and the second node communicate through a communication network.

16. The system according to claim 15, wherein the communication network is a Dedicated Short Range Communication (DSRC) network, or a cellular network.

17. The method according to claim 6, wherein the position variation vector from the first node to the second node is obtained by performing a double differentiation operation on the first position data and the second position data.

18. The system according to claim 14, wherein the position variation vector from the first node to the second node is obtained by performing a double differentiation operation on the first position data and the second position data.

\* \* \* \* \*